(12) United States Patent
Jing et al.

(10) Patent No.: US 9,568,753 B2
(45) Date of Patent: Feb. 14, 2017

(54) TURNOVER DEVICE, SUBSTRATE CELL-ASSEMBLING APPARATUS AND SUBSTRATE CELL-ASSEMBLING METHOD

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yangkun Jing, Beijing (CN); Shengguang Sang, Beijing (CN); Guofang Sun, Beijing (CN); Zhiqiang Liu, Beijing (CN); Zhousheng Zhang, Beijing (CN); Xiaopan Che, Beijing (CN); Tandong Zheng, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/832,004

(22) Filed: Aug. 21, 2015

(65) Prior Publication Data

US 2016/0139438 A1 May 19, 2016

(30) Foreign Application Priority Data

Nov. 17, 2014 (CN) .......................... 2014 1 0654593

(51) Int. Cl.
*H01L 21/68* (2006.01)
*G02F 1/13* (2006.01)
(Continued)

(52) U.S. Cl.
CPC ............. *G02F 1/1303* (2013.01); *B65H 15/00* (2013.01); *G02F 2001/133354* (2013.01)

(58) Field of Classification Search
CPC ........... H01L 21/6838; H01L 21/67706; H01L 21/67092; H01L 21/67736; C23C 14/50; C23C 14/24; C23C 14/541
See application file for complete search history.

(56) References Cited

U.S. PATENT DOCUMENTS

| | | | |
|---|---|---|---|
| 7,682,125 B2 * | 3/2010 | Binder | B65G 47/90 414/797.2 |
| 7,909,156 B2 * | 3/2011 | Wen | B65G 49/067 198/346.1 |
| 2006/0045722 A1 | 3/2006 | Hashimoto | |

FOREIGN PATENT DOCUMENTS

| | | |
|---|---|---|
| CN | 1712333 A | 12/2005 |
| CN | 101488469 A | 7/2009 |

(Continued)

OTHER PUBLICATIONS

First Chinese Office Action dated Sep. 5, 2016; Appln. No. 201410654593.3.

*Primary Examiner* — Tracie Y Green
(74) *Attorney, Agent, or Firm* — Ladas & Parry LLP (57) ABSTRACT

A turnover device, a substrate cell-assembling apparatus and a substrate cell-assembling method are provided. The turnover device comprises: a fixed support and a turnover platform connected with the fixed support by a first rotary shaft, the turnover platform having a first suction surface and a second suction surface which are oppositely arranged and are configured to suction a substrate; a second rotary shaft and a third rotary shaft, configured to respectively drive the first suction surface and the second suction surface to rotate in an in-plane direction, axial directions of the second rotary shaft and the third rotary shaft being basically perpendicular to that of the first rotary shaft. The turnover platform is configured to turn over the first suction surface and the second suction surface by the first rotary shaft.

20 Claims, 4 Drawing Sheets

(51) Int. Cl.
*B65H 15/00* (2006.01)
*G02F 1/1333* (2006.01)

(56) References Cited

FOREIGN PATENT DOCUMENTS

| | | |
|---|---|---|
| CN | 102658897 A | 9/2012 |
| CN | 103523555 A | 1/2014 |
| CN | 103592790 A | 2/2014 |
| JP | 2009-237287 A | 10/2009 |

* cited by examiner

TURNOVER DEVICE, SUBSTRATE CELL-ASSEMBLING APPARATUS AND SUBSTRATE CELL-ASSEMBLING METHOD

TECHNICAL FIELD

Embodiments of the present invention relate to a turnover device, a substrate cell-assembling apparatus and a substrate cell-assembling method.

BACKGROUND

With development of a liquid crystal display technology, a liquid crystal display device has been widely applied to various electronic products due to advantages such as light weight and small size. The liquid crystal display device comprises a liquid crystal display panel and a backlight module, wherein the liquid crystal display panel comprises two substrates and a liquid crystal layer positioned between the two substrates. The two substrates need to be cell-assembled to form a liquid crystal cell to contain liquid crystal molecules. One of the substrates needs to be turned over by a turnover device in a cell-assembling process and then is cell-assembled with the other substrate.

Figure 1:
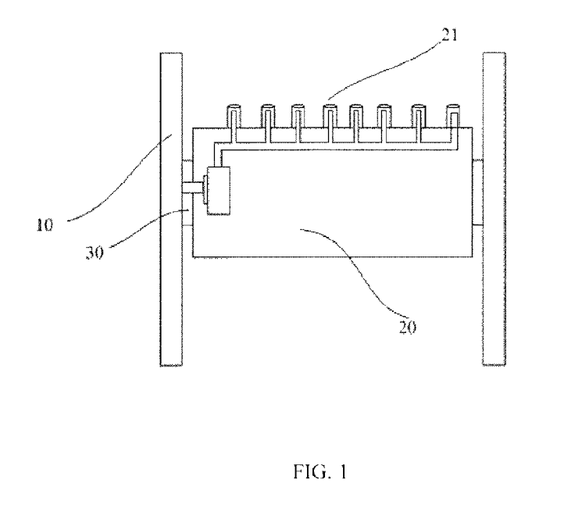
FIG. 1 is a schematic diagram of a conventional turnover device.

As illustrated in FIG. 1, an existing turnover device comprises a fixed support 10 and a turnover platform 20. The turnover platform 20 is connected with the fixed support 10 by a rotary shaft 30. One surface of the turnover platform 20 is a suction surface 21 with a plurality of suction units, for suctioning the substrate. Upon the suction surface 21 of the turnover platform 20 suctions the substrate and the turnover platform 20 is turned over by 180 degrees along a preset direction, the substrate suctioned by the turnover platform 20 is also turned over by 180 degrees along with the turnover platform, then the substrate is taken down by a mechanical arm and is cell-assembled with the other substrate, so as to form the liquid crystal display panel.

SUMMARY OF THE INVENTION

According to an embodiment of the present invention, there is provided a turnover device, comprising: a fixed support and a turnover platform connected with the fixed support by a first rotary shaft, the turnover platform having a first suction surface and a second suction surface which are oppositely arranged and are configured to suction a substrate;

a second rotary shaft and a third rotary shaft, configured to respectively drive the first suction surface and the second suction surface to rotate in an in-plane direction, axial directions of the second rotary shaft and the third rotary shaft being substantially perpendicular to an axial direction of the first rotary shaft, wherein the turnover platform is configured to turn over the first suction surface and the second suction surface by the first rotary shaft.

According to another embodiment, there is provided a substrate cell-assembling apparatus, comprising the above turnover device.

According to still another embodiment of the present invention, there is provided a substrate cell-assembling method, comprising steps of:

suctioning a substrate by a first suction surface or a second suction surface of a turnover device, and turning over the substrate to face an aligning device for carrying a cell-assembling substrate;

detecting a position relationship between the substrate suctioned by the first suction surface or the second suction surface of the turnover device and the cell-assembling substrate carried on the aligning device and aligning the suctioned substrate with the cell-assembling substrate; and cell-assembling the suctioned substrate and the cell-assembling substrate, re-detecting the position relationship between the suctioned substrate and the cell-assembling substrate, and aligning the suctioned substrate with the cell-assembling substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Inventors find that a turnover device as illustrated in FIG. 1 has at least problems below: as the turnover platform 20 of the conventional turnover device has only one suction surface 21, after a substrate is taken away by a mechanical arm, the turnover platform needs to be turned over by 180 degrees along a direction opposite to the preset direction to reset the suction surface 21 of the turnover platform 20, so as to further suction and turn over other substrates. Therefore, the production efficiency is reduced, and the work efficiency of the turnover device is low.

First Embodiment

As illustrated in FIGS. 2-5, the embodiment provides a turnover device, comprising a fixed support 10, a turnover platform 20 connected with the fixed support 10 by a vertical rotary shaft 30, a first horizontal rotary shaft 41 and a second horizontal rotary shaft 42 which are used for driving a first suction surface 21 and a second suction surface 22 to rotate in a horizontal direction respectively, as well as a vacuum suction unit and a control unit. The turnover platform 20 has the first suction surface 21 and the second suction surface 22 which are oppositely arranged and used for suctioning a substrate; the control unit is used for controlling the vacuum suction unit to suction the substrate by the first suction surface 21 or the second suction surface 22, and the turnover platform 20 turns over the suctioned substrate by the vertical rotary shaft 30.

Figure 2:
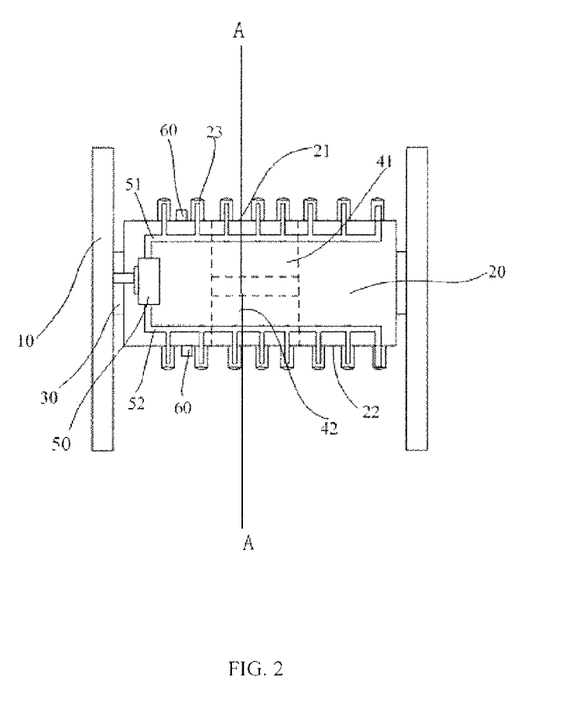
FIG. 2 is a schematic diagram of a turnover device in a first embodiment of the present invention.

In the turnover device of the present embodiment, when the first suction surface 21 faces one side of the substrate to be turned over, the second suction surface 22 faces a substrate unloading side; and when the second suction surface 22 faces one side of the substrate to be turned over, the first suction surface 21 faces the substrate unloading side. So when the substrate suctioned to one of the suction surfaces is turned over, the other suction surface can be directly used to suction another substrate, so that electric energy is saved, and a turnover efficiency of multiple substrates is improved.

Meanwhile, in the embodiment, the turnover device further comprises the first horizontal rotary shaft 41 and the second horizontal rotary shaft 42 for enabling the first suction surface 21 and the second suction surface 22 to rotate in the horizontal direction, due to such arrangement, after the substrate suctioned to one of the suction surfaces is turned over and is pre-aligned with a cell-assembling substrate to be cell-assembled with the substrate, as the substrate and the cell-assembling substrate are the same in position, when the suction surface is turned over back to one side of the substrate to be turned over so as to turn over a subsequent substrate, it is unnecessary to pre-align the substrate turned over later with the cell-assembling substrate thereof, so that the aligning efficiency of the substrates is greatly improved and a yield is improved.

For example, axial directions of the first horizontal rotary shaft 41 and the second horizontal rotary shaft 42 are substantially perpendicular to an axial direction of the vertical rotary shaft 30.

Figure 3:
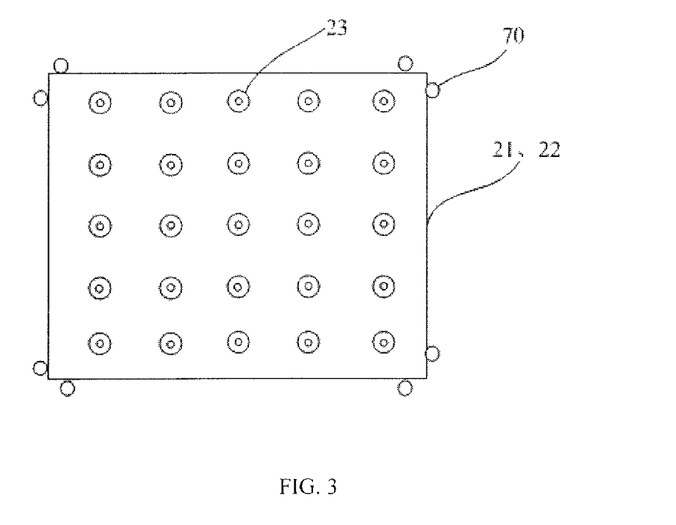
FIG. 3 is a schematic diagram of a first suction surface or a second suction surface of the turnover device in first embodiment of the present invention.
Figure 4:
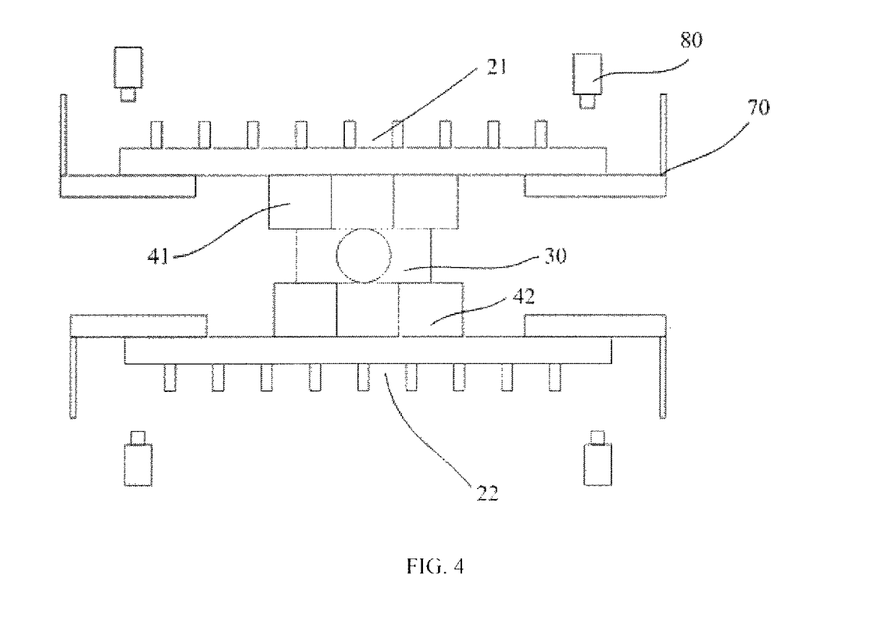
FIG. 4 is an A-A sectional view of FIG. 3.

In some examples, a plurality of suction pillars 23 arrayed in matrix is arranged on the first suction surface 21 and the second suction surface 22, and interiors of the suction pillars 23 are hollow. The suction pillars 23 are used for supporting and suctioning the substrates; as the suction pillars 23 are arrayed in matrix, stress on the substrate in the suctioning process is uniform and a phenomenon of damage to the substrate occurring in the suctioning process is effectively prevented.

Figure 5:
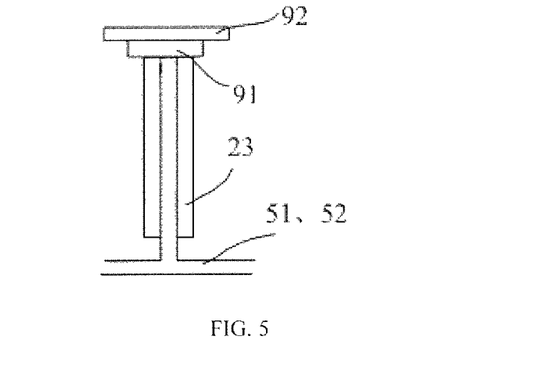
FIG. 5 is a structural diagram of suction pillars of the turnover device in the first embodiment of the present invention.

As illustrated in FIG. 5, for example, damping springs 91 are connected to opening ends of the suction pillars 23 and vacuum suckers 92 are connected to the damping springs 91. Due to such arrangement, after the substrate is turned over and when the turned substrate is taken down by the mechanical arm, the mechanical arm can be inserted between the vacuum suckers and the substrate suctioned by the vacuum suckers, the damping springs have a certain buffering effect at the moment, and then the mechanical arm can stably and safely take down the turned substrate.

Figure 6:
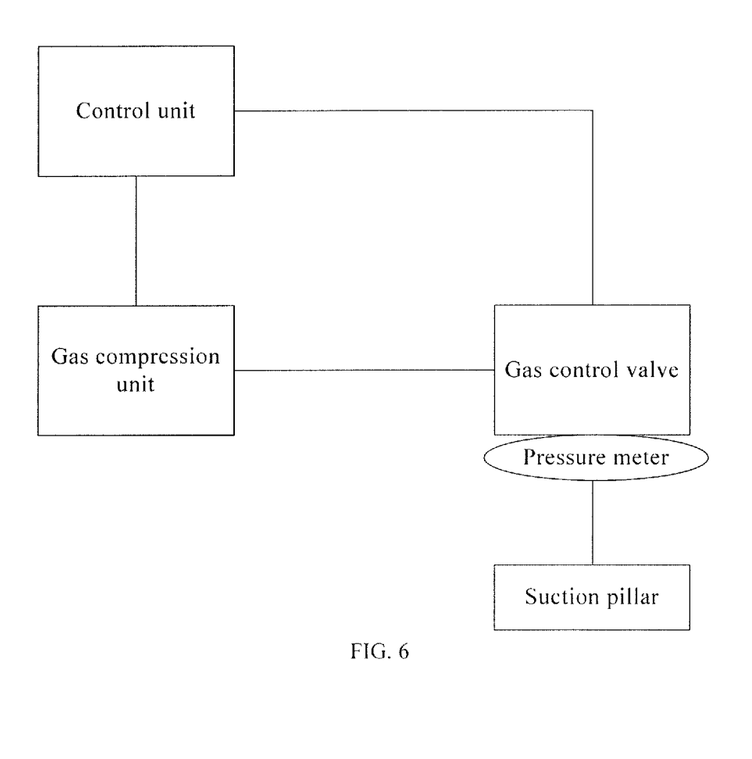
FIG. 6 is a block diagram of a connection relationship of some parts of the turnover device in the first embodiment of the invention.

In some examples, the vacuum suction unit is communicated with the suction pillars on the first suction surface and the second suction surface, and the control unit is configured to control the vacuum suction unit to suction the substrate by the first suction surface and the second suction surface, as illustrated in FIG. 2 and FIG. 6.

In some examples, the vacuum suction unit in the embodiment includes a first gas pipe 51, a second gas pipe 52, a gas control valve 50 and a gas compression unit; both the first gas pipe 51 and the second gas pipe 52 include a plurality of branches communicated with and extending into the suction pillars 23. For example, the first gas pipe 51 is used for communicating the suction pillars on the first suction surface with the gas control valve 50, and the second gas pipe 52 is used for communicating the suction pillars on the second suction surface with the gas control valve 50. Gas inlets of the first gas pipe 51 and the second gas pipe 52 are communicated with the gas control valve 50; the gas control valve has one end connected with the gas inlets of the first gas pipe 51 and the second gas pipe 52 and the other end connected with the air compression unit, for controlling opening and closing of the first gas pipe 51 and the second gas pipe 52 under control of the control unit; the gas compression unit is used for controlling charging and discharging of gas under control of the control unit. Aligning clips 70 for clamping a substrate are arranged on edge regions of the first vacuum suction surface 21 and the second vacuum suction surface 22. It needs to be explained that the gas compression unit in the embodiment have both a gas blowing function and a gas exhausting function; and of course, the gas compression unit may also include a gas exhausting module and a gas blowing module.

For example, when the first suction surface 21 faces the side of the turned substrate, the control unit controls the gas control valve to open the first gas pipe 51, and blows gas into the first gas pipe 51 by the gas compression unit, and the substrate to be turned over is placed on the first suction surface 21; as gas is blown into the first gas pipe 51, certain gap will exist between the substrate and the suction pillars 23, at which moment four corners of the substrate are clamped on the first suction surface 21 by the aligning clips 70, gas blowing to the first gas pipe 51 is stopped, the first gas pipe 51 is vacuumized by the gas compression unit to suction the substrate on the first suction surface 21, and then the aligning clips 70 are opened, so as to turn over the substrate.

In some examples, the vacuum suction unit further includes a pressure meter, the pressure meter being arranged between the gas control valve and the inlet ends. If a pressure value in the first gas pipe 51 or the second gas pipe 52, detected by the pressure meter, is lower than a pressure value set in the control unit, it means that the substrate to be turned over has been firmly suctioned by the suction surface, so the vertical rotary shaft 30 can be controlled to turn over the substrate.

In some examples, substrate inductive sensors 60 are arranged on the first suction surface 21 and the second suction surface 22. The substrate inductive sensors 60 are used for sensing whether the substrate to be turned over is placed above the first suction surface 21 or the second suction surface 22, so that the turnover device of the embodiment is more intelligent.

In some examples, aligning cameras 80 are arranged on the first suction surface 21 and the second suction surface 22. The cameras 80 are used for collecting a position of the substrate suctioned on the first suction surface 21 or the second suction surface 22, and further sending position information to the control unit, so that the control unit can compare the position of the suctioned substrate with a position of a substrate to be cell-assembled with the suctioned substrate, the substrate suctioned on the corresponding suction surface can be rotated by the first horizontal rotary shaft 41 or the second horizontal rotary shaft 42, and then the suctioned substrate and the cell-assembling substrate to be cell-assembled with the suctioned substrate can be pre-aligned.

Second Embodiment

Figure 7:
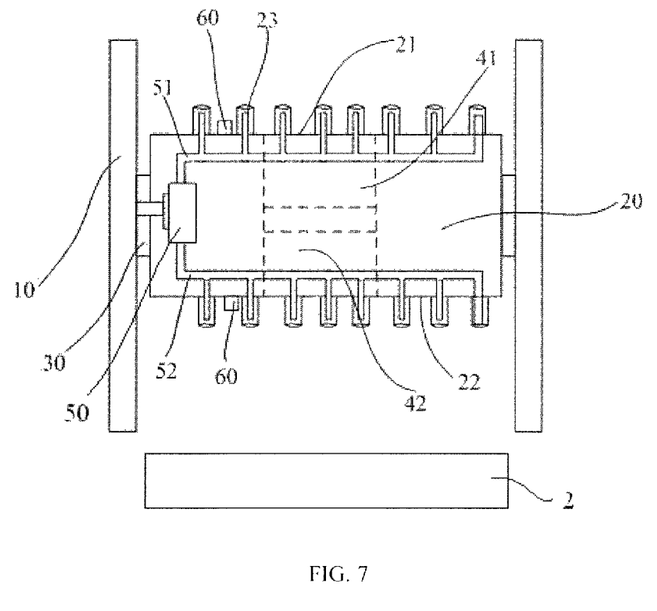
FIG. 7 is a structural schematic diagram of a substrate cell-assembling apparatus according to a second embodiment of the present invention.

The embodiment provides a substrate cell-assembling apparatus, the substrate cell-assembling apparatus comprising the turnover device according to the first embodiment. Of course, the substrate cell-assembling apparatus of the embodiment further comprises an aligning device for carrying a cell-assembling substrate. As illustrated in FIG. 7, the substrate cell-assembling apparatus comprises the turnover device of the abovementioned embodiment and an aligning device 2. The substrate suctioned on the turnover device and the substrate arranged on the aligning device are mutually aligned and then cell-assembled with each other.

As the turnover device of the embodiment can pre-align with the cell-assembling substrate before cell-assembled with the cell-assembling substrate, so the aligning is more accurate and the aligning time is saved.

It needs to be explained that at present, in the field of display technology, a conventional display substrate like a panel with two substrates is usually manufactured by a precise cell-assembling process, such as a TFT-LCD liquid crystal display substrate or a liquid crystal cell used cooperatively with the TFT-LCD liquid crystal display substrate to realize a 3D effect, and pre-aligning precision of the two substrates needs to be strictly controlled. At present, the substrate cell-assembling apparatus will perform a substrate deviation examination on the aligned substrates, namely, the turnover device detects a substrate deviation before cell-assembling. Meanwhile, the display substrate after vacuum cell-assembling is completed is also subjected to detection of the aligning precision, so that the precisions of pre-aligning mark positions of the upper and lower substrates can be timely fed back, to reduce quality problems caused by low process precision. However, all detections are based on judgment on a design reference. As the cell-assembling process has multiple procedures performed together, if a deviation at each position is not treated well, all deviations are accumulated together, which shall affect a finial aligning precision. In addition, in a vacuum cell-assembling machine, the substrates pass a carrying apparatus after pre-aligning, and the carrying apparatus has a rotary mechanism and a turnover mechanism, both of which operate the substrates before sealant is cured, and both cause a pre-aligning deviation of the substrates which have been precisely aligned, so this part of offset needs to be compensated.

A main body in the substrate cell-assembling apparatus is the aligning device, which is used for placing the cell-assembling substrate, and includes a component for moving the substrate. Charge Coupled Device (CCD) cameras are arranged above the aligning device; according to an area covered by a selected CCD camera, a CCD camera capable of shooting a whole detection picture of the substrate at one time or a CCD camera of a scanning type can be adopted. For example, four CCD cameras are arranged at positions opposite to the four corners of the substrate. The CCD cameras shoot images of the substrate, and are connected to an image collecting unit and an image processing unit; the image processing unit is, for example, a computer, for identifying the images shot by the CCD cameras, and obtaining positions of marks on the images by identifying the marks on the collected images according to pre-stored marked images; a Programmable Logic Controller (PLC) compares the positions of the marks with reference positions to obtain a distance by which the substrate needs to be moved and sends the distance to a motion controller, the motion controller controls a step motor according to the distance, and the step motor drives the component for moving the substrate, so as to adjust the substrate to a proper position. A pre-aligning machine is further provided with a pre-aligning LED light source below the substrate, to facilitate the CCD cameras shooting images.

Third Embodiment

The embodiment provides a substrate cell-assembling method, comprising steps 1-3.

Step 1: suctioning a substrate by a first suction surface 21 or a second suction surface 22 of a turnover device, and turning over the substrate to face an aligning device for carrying a cell-assembling substrate.

Step 2: detecting a position relationship between the substrate suctioned by the first suction surface 21 or the second suction surface 22 of the turnover device and the cell-assembling substrate carried on the aligning device, and aligning the suctioned substrate with the cell-assembling substrate.

Step 3: cell-assembling the suctioned substrate with the cell-assembling substrate, re-detecting the position relationship between the suctioned substrate and the cell-assembling substrate, and aligning the suctioned substrate with the cell-assembling substrate.

When a fixed position after the substrates are cell-assembled is not good, the embodiment may further comprises a step 4 of horizontally rotating the substrate suctioned on the suction surface; if the fixed position is still not good after rotation for one circle, it may be judged that the bad fixed position of the substrate is caused by the turnover device; and if the fixed position is not bad any more, it shows that the bad fixed position of the substrate is caused by a previous process; at that time, the bad fixed position is overcome by rotation, which greatly reduces loss of products.

The turnover device adopted in the present embodiment is the turnover device in first embodiment, so after the substrate suctioned to one of the suction surfaces is turned over, the other suction surface can be directly used to suction another substrate, so that electric power is saved, and a turnover efficiency of multiple substrates is improved; meanwhile, the embodiment further comprises a first horizontal rotary shaft 41 and a second horizontal rotary shaft 42 which enable the first suction surface 21 and the second suction surface 22 to rotate in the horizontal direction respectively, due to such arrangement, after the substrate suctioned to one of the suction surfaces is turned over and is pre-aligned with a cell-assembling substrate to be cell-assembled with the suctioned substrate, as the substrate and the cell-assembling substrate are same in position, when the suction surface is turned over back to one side of the substrate to be turned over so as to turn over a subsequent substrate, it is unnecessary to pre-align the substrate turned over later with the cell-assembling substrate thereof, so that the aligning efficiency of the substrates is greatly improved and a yield is improved.

The step 3 of the substrate cell-assembling method in the embodiment specially comprises steps S1-S3.

S1: respectively detecting a feeding position of the suctioned substrate and that of the cell-assembling substrate;

S2: detecting the positions of the two substrates which are aligned;

S3: using an offset between the feeding positions and the aligning positions of the two substrates as a compensation amount to adjust the positions of the suctioned substrate and the cell-assembling substrate.

In the embodiment, the offset obtained by detecting the positions of the turned substrates and the final aligning positions is adopted to provide comprehensive compensation adjustment for the pre-aligning precision, the method is fast and convenient, an activation and product pre-aligning precision of a production line can be effectively improved, a display effect of a product is improved, failed aligning caused by large difference between substrate feeding positions and the aligning positions is avoided, the moving distance during substrate aligning is effectively prolonged, and a residual stress in adhesive is relatively small, so when a pressed cell is recovered, an aligning change is small, which improves the aligning precision and guarantees the aligning efficiency. Through feedback control on turning and aligning procedures, the poor pre-aligning caused by process fluctuation is effectively avoided.

The foregoing embodiments merely are exemplary embodiments of the invention, and not intended to define the scope of the invention, and the scope of the invention is determined by the appended claims.

The application claims priority of Chinese Patent Application No. 201410654593.3 filed on Nov. 17, 2014, the disclosure of which is incorporated herein by reference in its entirety as part of the present application.

What is claimed is:

1. A turnover device, comprising: a fixed support, and a turnover platform connected with the fixed support by a first rotary shaft, the turnover platform having a first suction surface and a second suction surface which are oppositely arranged and are configured to suction a substrate;
a second rotary shaft and a third rotary shaft, configured to respectively drive the first suction surface and the second suction surface to rotate in an in-plane direction, axial directions of the second rotary shaft and the third rotary shaft being substantially perpendicular to an axial direction of the first rotary shaft,
wherein the turnover platform is configured to turn over the first suction surface and the second suction surface by the first rotary shaft.

2. The turnover device according to claim 1, wherein a plurality of suction pillars arrayed in matrix is arranged on the first suction surface and the second suction surface, and the suction pillars are hollow.

3. The turnover device according to claim 2, further comprising a vacuum suction unit and a control unit, the vacuum suction unit being communicated with the suction pillars on the first suction surface and the second suction surface, and the control unit being configured to control the vacuum suction unit to suction the substrate by the first suction surface and the second suction surface.

4. The turnover device according to claim 2, wherein ends of the suction pillars opposite to ends connected to the first suction surface and the second suction surface are opening ends, the opening ends of the suction pillars having damping springs connected thereto and the damping springs being connected with vacuum suckers.

5. The turnover device according to claim 3, wherein the vacuum suction unit includes a first gas pipe, a second gas pipe, a gas control valve and a gas compression unit;
the first gas pipe communicates the suction pillars on the first suction surface with the gas control valve, and the second gas pipe communicates the suction pillars on the second suction surface with the gas control valve;
the gas control valve is communicated with the gas compression unit, and is configured to control opening and closing of the first gas pipe and the second gas pipe under control of the control unit;
the gas compression unit is configured to control charging and discharging of gas under control of the control unit.

6. The turnover device according to claim 5, wherein the vacuum suction unit further includes a pressure meter, the pressure meter being arranged between the gas control valve and inlet ends of the first gas pipe and the second gas pipe.

7. The turnover device according to claim 1, wherein aligning cameras are arranged on the first suction surface and the second suction surface.

8. The turnover device according to claim 1, wherein aligning clips for clamping a substrate are arranged on edge regions of the first suction surface and the second suction surface.

9. The turnover device according to claim 1, wherein substrate inductive sensors are arranged on the first suction surface and the second suction surface.

10. A substrate cell-assembling apparatus, comprising a turnover device, the turnover device includes:
a fixed support and a turnover platform connected with the fixed support by a first rotary shaft, the turnover platform having a first suction surface and a second suction surface which are oppositely arranged and are configured to suction a substrate;
a second rotary shaft and a third rotary shaft, configured to respectively drive the first suction surface and the second suction surface to rotate in an in-plane direction, axial directions of the second rotary shaft and the third rotary shaft being substantially perpendicular to an axial direction of the first rotary shaft,
wherein the turnover platform is configured to turn over the first suction surface and the second suction surface by the first rotary shaft.

11. The substrate cell-assembling apparatus according to claim 10, further comprising: an aligning device carrying a cell-assembling substrate.

12. The substrate cell-assembling apparatus according to claim 10, wherein a plurality of suction pillars arrayed in matrix is arranged on the first suction surface and the second suction surface, and the suction pillars are hollow.

13. The substrate cell-assembling apparatus according to claim 12, further comprising: a vacuum suction unit and a control unit, the vacuum suction unit being communicated with the suction pillars on the first suction surface and the second suction surface, and the control unit being configured to control the vacuum suction unit to suction the substrate by the first suction surface and the second suction surface.

14. The substrate cell-assembling apparatus according to claim 12, wherein ends of the suction pillars opposite to ends connected to the first suction surface and the second suction surface are opening ends, the opening ends of the suction pillars having damping springs connected thereto and the damping springs being connected with vacuum suckers.

15. The substrate cell-assembling apparatus according to claim 13, wherein the vacuum suction unit includes a first gas pipe, a second gas pipe, a gas control valve and a gas compression unit;
the first gas pipe communicates the suction pillars on the first suction surface with the gas control valve, and the second gas pipe communicates the suction pillars on the second suction surface with the gas control valve;
the gas control valve is communicated with the gas compression unit, and is configured to control opening and closing of the first gas pipe and the second gas pipe under control of the control unit;

the gas compression unit is configured to control charging and discharging of gas under control of the control unit.

16. The substrate cell-assembling apparatus according to claim 15, wherein the vacuum suction unit further includes a pressure meter, the pressure meter being arranged between the gas control valve and inlet ends of the first gas pipe and the second gas pipe.

17. The substrate cell-assembling apparatus according to claim 10, wherein aligning cameras are arranged on the first suction surface and the second suction surface.

18. The substrate cell-assembling apparatus according to claim 10, wherein aligning clips for clamping a substrate are arranged at edge regions of the first suction surface and the second suction surface.

19. The substrate cell-assembling apparatus according to claim 10, wherein substrate inductive sensors are arranged on the first suction surface and the second suction surface.

20. A substrate cell-assembling method, comprising steps of:

suctioning a substrate by a first suction surface or a second suction surface of a turnover device, and turning over the substrate to face an aligning device for carrying a cell-assembling substrate;

detecting a position relationship between the substrate suctioned by the first suction surface or the second suction surface of the turnover device and the cell-assembling substrate carried on the aligning device, and aligning the suctioned substrate with the cell-assembling substrate; and cell-assembling the suctioned substrate with the cell-assembling substrate, re-detecting the position relationship between the suctioned substrate and the cell-assembling substrate, and aligning the suctioned substrate with the cell-assembling substrate.

* * * * *